United States Patent
Hamburg

(10) Patent No.: US 7,126,578 B1
(45) Date of Patent: Oct. 24, 2006

(54) COMBINING RASTER AND VECTOR DATA IN THE PRESENCE OF TRANSPARENCY

(75) Inventor: Mark Hamburg, Scotts Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 352 days.

(21) Appl. No.: 10/098,328

(22) Filed: Mar. 15, 2002

Related U.S. Application Data

(60) Provisional application No. 60/292,193, filed on May 17, 2001.

(51) Int. Cl.
*G09G 5/00* (2006.01)

(52) U.S. Cl. .................. 345/156; 345/620

(58) Field of Classification Search ........... 345/620, 345/621, 622, 623, 624, 638, 639, 640, 641, 345/156

See application file for complete search history.

(56) References Cited

U.S. PATENT DOCUMENTS

| | | | | |
|---|---|---|---|---|
| 5,396,585 A * | 3/1995 | Fujii et al. | ........ | 345/621 |
| 5,651,107 A * | 7/1997 | Frank et al. | ........ | 345/768 |
| 5,777,625 A * | 7/1998 | Rossin | ........ | 345/620 |
| 5,923,381 A * | 7/1999 | Demay et al. | ........ | 348/592 |
| 6,005,586 A * | 12/1999 | Morita et al. | ........ | 345/624 |
| 6,377,269 B1 * | 4/2002 | Kay et al. | ........ | 345/589 |
| 6,529,208 B1 * | 3/2003 | Chun et al. | ........ | 345/629 |
| 6,535,635 B1 * | 3/2003 | Klassen et al. | ........ | 382/167 |

OTHER PUBLICATIONS

Rose, Carla. "Sams Teach Yourself Adobe Photoshop 5.5 in 24 Hours". Sams Publishing Copyright 2000.*

* cited by examiner

*Primary Examiner*—Jeffrey A Brier
*Assistant Examiner*—Hwa C. Lee
(74) *Attorney, Agent, or Firm*—Fish & Richardson P.C.

(57) ABSTRACT

Methods and apparatus implementing a technique for preparing one or more vector data objects for rendering. In general, in one aspect, the technique includes receiving an object that is a vector data object and defining clipping states of the object. Each clipping state of the object represents an appearance of the object for a region of the object. The technique includes, for each clipping state, determining whether a clipping path is needed to render the appearance of the object represented by the clipping state and generating clipping instructions in accordance with the determining. The technique includes, for each clipping state, generating rendering instructions for rendering the appearance of the region of the object represented by the clipping state. The technique includes associating the generated clipping and rendering instructions to the corresponding clipping states.

22 Claims, 6 Drawing Sheets
(5 of 6 Drawing Sheet(s) Filed in Color)

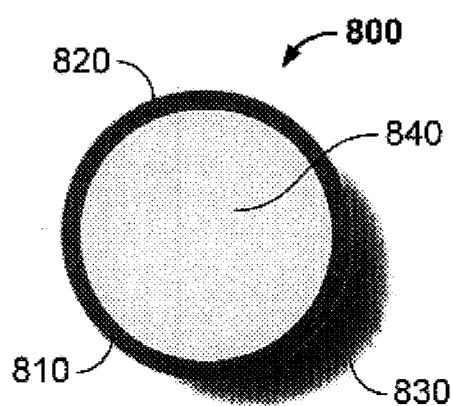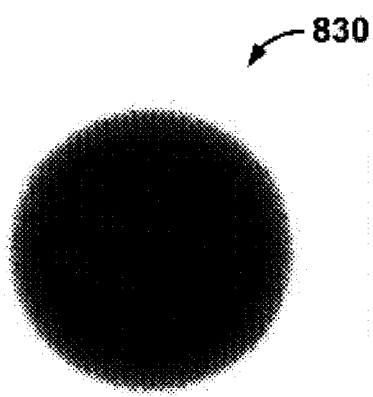
FIG. 8A  FIG. 8B
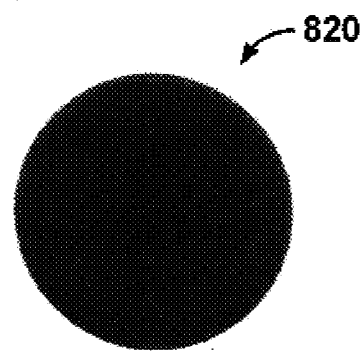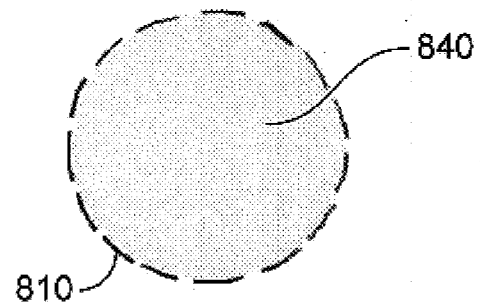
FIG. 8C  FIG. 8D

COMBINING RASTER AND VECTOR DATA IN THE PRESENCE OF TRANSPARENCY

CROSS-REFERENCE TO RELATED APPLICATIONS

This application claims benefit of U.S. Provisional Application No. 60/292,193, filed May 17, 2001, which is incorporated herein by reference in its entirety.

BACKGROUND OF THE INVENTION

The present invention relates to combining raster and vector data in the presence of transparency.

Generally, graphics computer programs such as the Photoshop® available from Adobe Systems Incorporated of San Jose, Calif., have imaging models that use both raster and vector data. These imaging models generally have constructs that support compositing effects such as layering and opacity, including per pixel transparency with respect to raster data, object level transparency, and color blending.

Some imaging models cannot support some of the compositing effects mentioned. Specifically, these imaging models lack the constructs needed to support the compositing effects. These imaging models will be referred to as simple imaging models.

In order to display a composition created from a first program having the mentioned constructs in a second program that lacks these constructs, i.e., one that has a simple imaging model, it is necessary to map data of the composition into a format compatible with the second program. Typically, the mapping causes a loss of vector data. Because of this loss, an image of the composition rendered by the second program sometimes has pixelated edges and appears fuzzy. An image that appears fuzzy will be referred to as a fuzzy image. An image that does not appear fuzzy will be referred to as a crisp image.

SUMMARY OF THE INVENTION

The present invention provides methods and apparatus, including computer program products, for combining raster and vector data into a format that preserves the resolution-independent quality of vectors.

In one implementation, a system in accordance with the invention combines raster and vector data in three phases: an analysis phase, an optional sorting phase, and an output phase. In the analysis phase, the system builds a list of vector objects where each object has a sequence of clipping states. Generally, a clipping state of an object is an appearance of the object within a certain region. Associated with each clipping state are clipping instructions and instructions on how to render the portion of the object clipped or the entire object if there is no clipping path. Clipping states are further described below. In the optional sorting phase, the system sorts the list of vector objects so it can avoid processing vector objects or portions of vector objects that are not needed to render an image because the vector objects or their portions are concealed. In the output stage, the system recursively processes the list of vector objects to generate an output image.

In general, in one aspect, the invention provides a method for preparing one or more vector data objects for rendering. The method includes receiving a first object that is a vector data object. The method includes defining clipping states of the first object. Each clipping state of the first object represents an appearance of the first object for a region of the first object. The method includes determining, for each clipping state, whether a clipping path is needed to render the appearance of the first object represented by the clipping state. When a clipping state is needed, the method includes generating clipping instructions for calculating a clipping path for the clipping state. When a clipping path is not needed, the method includes generating clipping instructions indicating that a clipping path is not needed. The method includes generating, for each clipping state, rendering instructions for rendering the appearance of the region of the first object represented by the clipping state. The method includes associating the generated clipping and rendering instructions to the corresponding clipping states.

The invention can be implemented to realize one or more of the following advantages. Raster and vector data can be combined into a format that preserves the resolution-independent quality of vectors and that is fully supported by a simple imaging model. The raster and vector data combination preserves data describing per pixel transparency, object level transparency and color blending effects, and computed effects such as layering. A system in accordance with the invention supports multipart vector objects without having to convert them into general artwork. The system suppresses superfluous branches of recursions when recursively clipping. The system applies the technique of object concealment to cases where an object is partially concealed. The system needs information about imaging models only at the analysis phase and not at the optional sort or the output phases. Consequently, the recursive portion of the output phase does not need to change if the imaging model changes. The recursion portion is also simplified by not trying to include optimizations for details of the imaging model. The system limits deep recursions and saves computing resources.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

FIGS. 8A–D illustrate clipping states in accordance with the invention.

Like reference symbols in the various drawings indicate like elements.

DETAILED DESCRIPTION

Methods and apparatus in accordance with the invention map imaging models of programs such as the Photoshop program into a format fully supported by programs that use simple imaging models such as the PostScript® and portable document format ("PDF") imaging models. Note that the techniques described below are not specific to the Photoshop imaging model and apply to other imaging models. For example, the techniques can be used to map PDF version 1.4 images back to PDF version 1.3 images.

The output of conversion processes in accordance with the invention that map one imaging model into another generally includes some indication of a region to clip to (using vector clipping) and a raster with which to fill that region. Where possible, the conversion process also retains elements as pure vector artwork such as filled or stroked paths and text. The conversion process recognizes that other constructs such as solid colors or gradients can be used in place of rasters.

Figure 1:
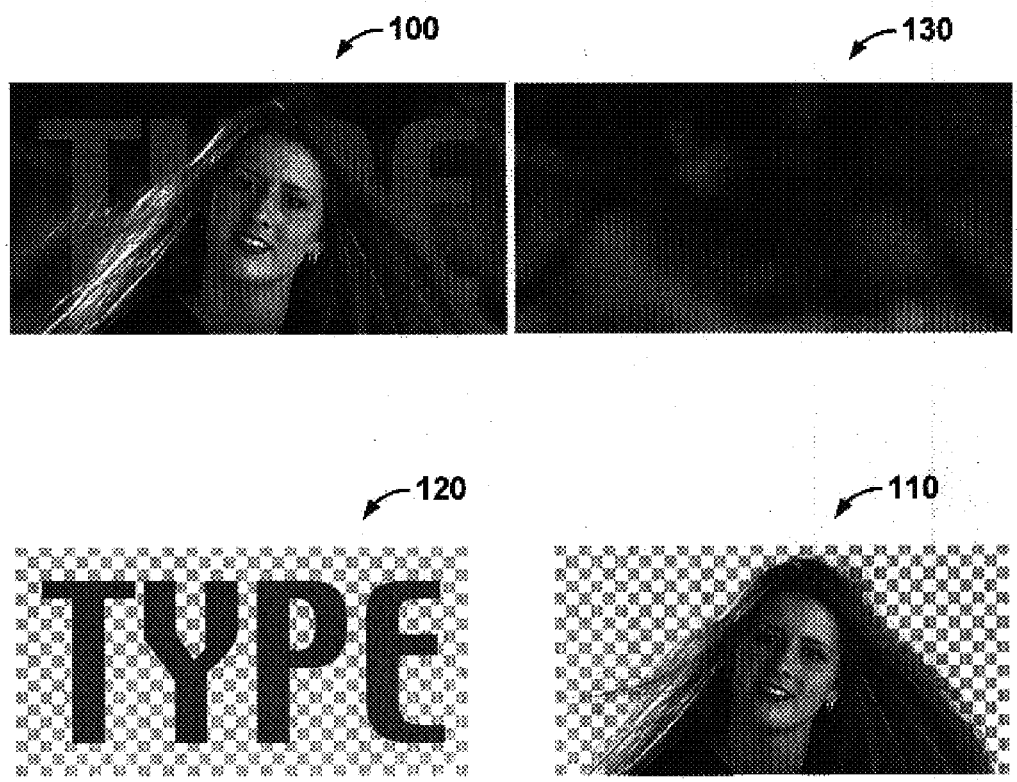
FIG. 1 shows a composition having three objects.

As shown in FIG. 1, an image 100 consists of a person 110 on top of some text 120. Both the text 120 and the person 110 are on top of a background 130. The text 120 appears behind the person 110 and in front of the background 130.

The PostScript imaging model allows a user to draw these three items in succession. The person 110 can be masked by a clipping path. However, a clipping path cannot adequately define the way the person's hair, which is blowing in the breeze, should interact with other elements in the image. While a clipping path allows a user to specify which portions of the image are part of the person and which portions are not, a clipping path does not allow a user to specify that the hair should be partially transparent in its thinnest areas. Using a clipping path would produce an image having a hard and unnatural transition between the person's hair and the background.

A hard transition is exactly what is desirable, however, around the edges of the type 120. One approach to building image 100 is to create the compositing in a program like Photoshop and simply generate a raster image. If one does so, however, the edges of the type 120 will not be rendered at the maximum possible resolution of an output device such as an image setter unless the entire raster image is also generated at that resolution. Rendering the entire image at the maximum resolution results in a huge composition file. Rendering the entire image at a resolution other than the maximum resolution results in pixelated edges. Thus, with the approach of compositing in Photoshop® and generating a raster image, a user ends up with either pixelated edges on the type or huge files.

Figure 2:
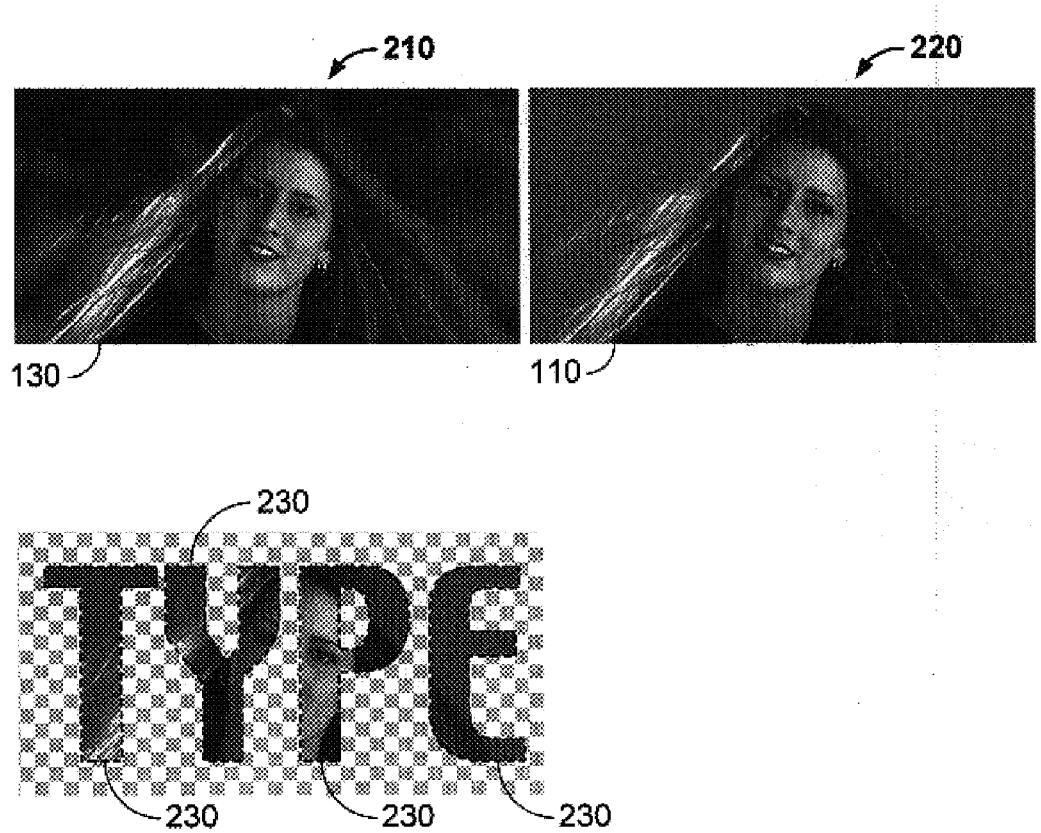
FIG. 2 illustrates a method for preventing pixelated edges.

FIG. 2 shows one solution to the problem described above. The solution includes a technique that builds two images for the composition. The first image, image 210, includes the background 130 plus the person 110 but without the type 120. The second image, image 220, includes the person 110 over the color information for the type 120, i.e., the imagery that appears in the interior of the type. The second image 220 is clipped to the outlines 230 of the type 120 and placed in the appropriate position in the composition. When the composition is sent to an output device such as an image setter, the type edges will be rendered at the resolution of the image setter but the raster data will be at the resolution that was used in building the image. Depending on the content of the raster data, the raster data can be a relatively low resolution without producing obvious undesirable visual artifacts in the image.

Note that the described technique can also handle cases where the text is partially opaque. In these cases, the image for the text interior shows the interaction of the text color with the background in addition to including the person.

The described technique illustrates two methods of conversion, recursive clipping and planar mapping. In each of these methods of conversion, vector data is expressed as clipping data. The output image is then calculated for each clipping path.

Figure 3:
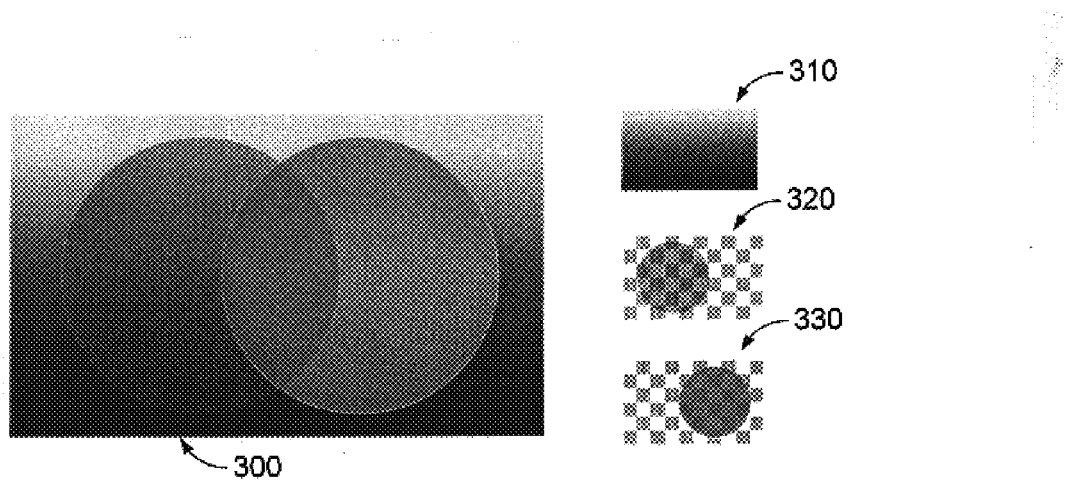
FIG. 3 shows a second composition having three objects.

FIG. 3 shows an image, image 300, having background 310 with a color gradient and two overlapping transparent circles 320 and 330. Circles 320 and 330 are vector objects. The overlap makes the problem more complex than the example just considered because it is now necessary to consider how the two circles 320 and 330 interact.

In both recursive clipping and planar mapping, image 300 is generated from four components: background 310 alone, background 310 plus the content of circle 320, background 310 plus the content of circle 330, and background 310 plus the contents of both circles 320 and 330. The content includes color data and blending instructions inside the circle, ignoring the boundary of the circle. The distinction between recursive clipping and planar mapping is in the clipping paths used.

Figure 4:
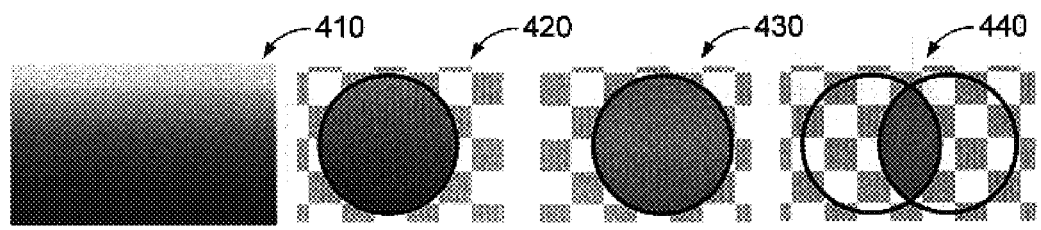
FIG. 4 illustrates a recursive clipping approach.

Generally, recursive clipping renders a composition by building and then processing subsets of a set of vector objects. For each subset, a clipping path is defined from the outlines of each element in the subset. Then, an image is drawn based on including the corresponding graphic elements and excluding the elements not represented in the subset. Furthermore, the clipping process can be simplified in a program, such as a PostScript interpreter, that supports pushing and popping a clipping stack with the current total clip being defined as the intersection of all of the clips on the stack. FIG. 4 and the method shown in Table 1 illustrate the recursive clipping technique just described.

TABLE 1

Draw background 310 (item 410)
Push a clip for circle 320
    Draw background 310 plus the content of circle 320 (item 420)
Pop the clip for circle 320
Push a clip for circle 330
    Draw background 310 plus the content of circle 330 (item 430)
    Push a clip for circle 320
        Draw background 310 plus the content of both circles 320, 330 (item 440)
    Pop the clip for circle 320
Pop the clip for circle 330

This approach is an application of a standard method for enumerating subsets of a set. It is also the format generated by the method of artwork filters discussed below.

Recursive clipping has the benefit of leaving all of the outline intersection calculations to a raster image processor ("RIP"). Having the RIP calculate outline intersection allows the calculations to be performed at the resolution of the RIP. Having the RIP calculate outline intersections also places the original outlines in an output file. In particular, if a format supports clipping to text, then the text can be placed in the output file without further computation of outlines.

Recursive clipping also has the benefit that an anti-aliasing rasterizer does not have to do subpixel sampling in order to avoid halos or gaps at the edges. This is because the recursive approach does not rely on the detection of abutting edges by the rasterizer.

There are two significant disadvantages to recursive clipping. First, recursive clipping requires the RIP to support a potentially deep set of nested clips. Falling back to rasterized vectors when a threshold for active clips is exceeded mitigates this problem. The other disadvantage is that the power set of the set of vector objects grows exponentially as the number of objects grows. Hence, to make the recursive clipping approach practical, it is necessary to aggressively reduce the set of subsets considered. Reducing the number of subsets will be referred to as pruning. The simplest approach to pruning is to note that once the intersection of the clip regions becomes empty, it is possible to discard that subset and any subset containing that subset. Because it is advantageous to avoid processing all of the geometry in detail and it is not possible to account for the exact scan conversion behavior of the final RIP, a conservative approximation to the area covered by a clip region is necessary. The simplest such approximation is a bounding box.

The pseudo-code shown in Table 2 below represents one recursive clipping method. The code generates a series of clipping operations and image drawing operations. Vector objects can be set to one of three states when rendering: hidden, shown, and content-only. The hidden state causes an object to not participate in the compositing process. The shown state causes an object to participate just as it normally would. The content-only state causes an object to participate normally except that the outline of the object is not considered. That is, the object's content is not clipped by the object's path. All of the vector objects start out in the shown state. All non-vector objects, such as rasterized objects, are always set to be in the shown state. The pseudo-code below is applied to a composition bounded by a rectangle. The composition also includes a set of vector objects. The recursive clipping process is started by invoking the pseudo-code with a list of all vector objects in the set and the rectangle bounding the composition. The pseudo-code composites the image for a region of interest (the rectangle, in this case).

TABLE 2

```
PROCEDURE GenerateRecursiveClippingOutput
    (objects: LIST OF VectorObject; rect: Rectangle);
    IF EmptyList (objects)THEN
        OutputImageForCompositedArtwork (rect);
    ELSE
        LET obj: VectorObject :=First (objects);
        LET objClip: VectorData :=GetVectorData (obj);
        LET objBounds: Rectangle :=VectorDataBounds (objClip);
        LET overlap: Rectangle :=Intersect (rect, objBounds);
        Set VectorObjectRenderingState (obj, hidden);
        GenerateRecursiveClippingOutput (Rest (objects), rect);
        IF NOT EmptyRectangle (overlap)THEN
            OutputPushClip (objClip);
            SetVectorObjectRenderingState (obj, contentOnly);
            GenerateRecursiveClippingOutput
                (Rest (objects), overlap);
            OutputPopClip ( );
        END;
        SetVectorObjectRenderingState (obj, shown);
    END
END GenerateRecursiveClippingOutput;
```

The implementation of image scaling in PostScript, PDF, and the lossy compression scheme used in Joint Photographic Experts Group ("JPEG") can cause stitching artifacts in any output that relies on rendering images inside of clipped regions. These artifacts will show up as areas where the colors output by the RIP on either side of a clipping path should match but fail to do so.

The PDF and PostScript scaling problems arise from the fact that drawing one big image does not necessarily result in the same thing as drawing the image in multiple pieces. To avoid stitching artifacts, it is necessary to draw an image that is the size of the entire artwork. However, most of this image would never be shown because only the portions inside the clipping is needed. The remaining portions can be represented in as compressed a form as possible. It may also be necessary to pad the region of interest to account for the effects of lossy compression schemes such as that of the JPEG.

One additional item to note with regard to recursive clipping is that while the size of the output file may grow exponentially with the number of objects if pruning does not work, the space consumed in the computation is linear in the number of objects. More sophisticated representations for the approximation to the current total clip can also result in an increase in space, but this is dependent on the precision desired and not on the number of objects.

Figure 5:
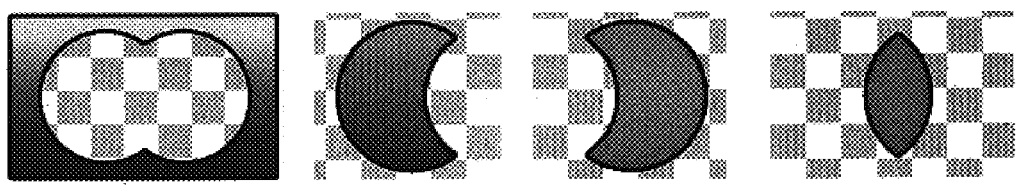
FIG. 5 illustrates a planar mapping approach.

In contrast to recursive clipping, planar mapping does not look at the subsets of the set of vector objects. Instead, it looks at the regions into which the set of vector objects carve a plane of the composition. In principle, each pixel is associated with exactly one region once the plane of the composition plane is carved. In practice, it is necessary to represent pixels along boundaries in the images for each region. FIG. 5 shows the regions generated by planar mapping. Note that none of the clipping paths being used correspond to outlines of objects in the original composition. Instead, the clipping paths are those formed by the intersections of outlines of the objects.

Generally, planar mapping separates an image into atomic regions. The basic procedure for planar mapping is to take each vector object in turn and add it to an accumulated planar map. Adding it to the map splits some regions into two. Associated with each region is a list of vector objects whose outlines bound the region. When the planar mapping is complete, the output image of the composition is built by processing each region, using the associated list of objects to render the portion of the image within the region.

Planar mapping trades the previously discussed potentially explosive growth of output size for the complexity of building a planar map. The program for planar mapping is much more complicated than that for recursive clipping. Additionally, the planar mapping approach consumes more memory space than does the recursive clipping approach. If vector objects are defined by Bézier curves, then the maximum number of regions in the map varies as the square of the number of Bézier segments in the vector objects. For objects, such as types, that have outlines of complex shape, the number of regions resulting from planar mapping increases significantly. The increase is not an exponential function of vector objects but rather a quadratic function of the number of Bézier segments.

Associated with each planar region is a list of vector objects. At worst, the memory-space consumption grows approximately as the cube of the number vector objects. Subdividing the image into smaller rectangles and excluding objects outside those rectangles mitigates this memory-space consumption problem. But if a region has too many complex outlines, the subdividing solution does not always avoid the memory-space consumption problem. This problem too can be mitigated. If lists of both included and excluded objects are kept for each region, subdivision can be limited and rasterized vectors can be used when either or both of these lists reached a size limit.

Planar mapping puts anti-aliasing rasterizers at a disadvantage because it requires the rasterizer either to use super-sampling or to recognize the shared edges on independent objects. If this is a significant concern, a format designed specifically to represent planar maps may be needed. The PostScript and PDF models do not provide such formats. A special format for planar maps can also lead to faster rasterization.

The following paragraphs describe artwork filters. Some vector-based illustration programs support the notion of filling a shape with a filter that operates on underlying artwork. For example, a circle can be filled with a magnification effect that results in an enlarged version of a portion of the underlying artwork to be seen through the circle. Transparency can be treated as a filtering effect by viewing the compositing of a color or colors with the underlying artwork as a color-transforming filter on the artwork. Generating an output from this method includes the following steps. An output stream for the elements beneath a filter object is generated. This stream is outputted. The filter is applied to the output stream to produce a filtered output stream. Instructions to clip to the object are outputted. The filtered stream is outputted. Instructions to restore the clip are outputted. The above steps do not apply only to output streams. They also apply to other representations such as artwork trees. When present, multiple filter objects are processed recursively using a principle similar to that of recursive clipping. The difference between the two principles is that instead of taking an execution path for each subset, the build up is done in the concatenation of the output streams. Alternatively, a stack of active artwork filters is maintained. This alternative more closely mirrors the principle of recursive clipping.

One advantage of the artwork-filter method is that the method can handle spatial transformation effects inside shapes. Both the recursive clipping and the planar mapping approaches cannot handle spatial transformation effects well because they are both concerned with finding the shapes that overlap particular pixels. On the other hand, the artwork-filter method potentially processes a significant amount of data to get its job done. The size of this data can grow exponentially.

The artwork-filter method also requires that everything interesting be treated as a filter. For example, to handle the initial example, one needs a filter object type that deals with raster data containing transparency.

In one implementation, a system in accordance with the invention performs an augmented recursive-clipping method. The augmentation includes the improvements listed below.

(1) The system generates clipping states to represent each object having vector data. Recall that a clipping state represents different appearances of an object. The system draws the clipping states by using a strict replacement model. Given an object having clipping states i and j, if a pixel is inside both state i and state j, and j is drawn subsequent to i, then the color value for the pixel from state j supersedes that for state i. The value for the pixel from state j ends up in the final rendered artwork. This replacement model is similar to the PostScript and PDF opaque imaging models for performing a series of fills. Note that if the resultant artwork involves transparency so that color and opacity data must be processed, then it is necessary to make a series of region fills where one set of color and opacity values are replaced with another.

(2) Each clipping state of an object includes special rendering instructions for the object. Special rendering instructions are instructions that specify more than just hiding the object or showing only the object's content. For example, the system can process the special rendering instructions to render only exterior effects or to render an interior of an object without the interior portion of a stroke effect. Exterior effects of a vector object are effects that occur outside the outline defined by the object's vector. For example, a drop shadow is an exterior effect because it occurs outside the outline of an object with which it is associated. Special rendering instructions include instructions that specify which portion of received rendering information is needed to render an appearance of a region of the object represented by the clipping state.

(3) Each clipping state of an object indicates whether the appearance of the object represented by the clipping state conceals zero or more other objects such that the present or absence of the concealed objects does not alter the appearance of the composition with respect to the clipping state. Note that in addition to concealing other objects by being opaque, a state can conceal other objects because they are constrained by the imaging model to appear only within certain clipping states. For example, if vector object A was only to be visible inside vector object B, then the clipping state representing the exterior of vector object B would conceal vector object A.

(4) In approximating a clip region for a clipping state of an object, the system accounts for areas that will be marked by other states of the object.

The first two enhancements allow the system to handle computed effects and to provide vector output for some of the effects. The second two enhancements provide significant improvements in the process of pruning the number of subsets the system must consider. The first enhancement also prunes the number of combinations of a vector object that must be considered. Without clipping states, it is necessary to represent any object with a sequence of more than two clipping states as multiple objects. For example, a vector object having a stroke and an interior must be represented as a stroke object and an interior object. The two objects require four combinations rather than three to examine in a recursive pass.

Figure 6:
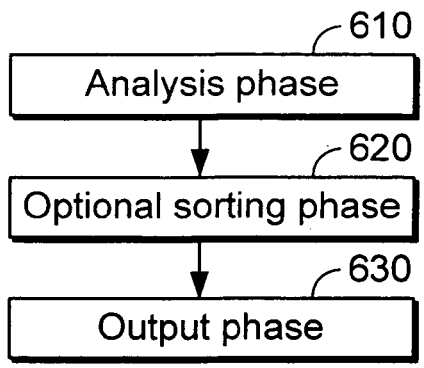
FIG. 6 shows an augmented recursive clipping method in accordance with the invention.

As shown in FIG. 6, the augmented recursive clipping method includes three phases: the analysis phase (step 610), the optional sorting phase (step 620), and the output phase (step 630).

Figure 7:
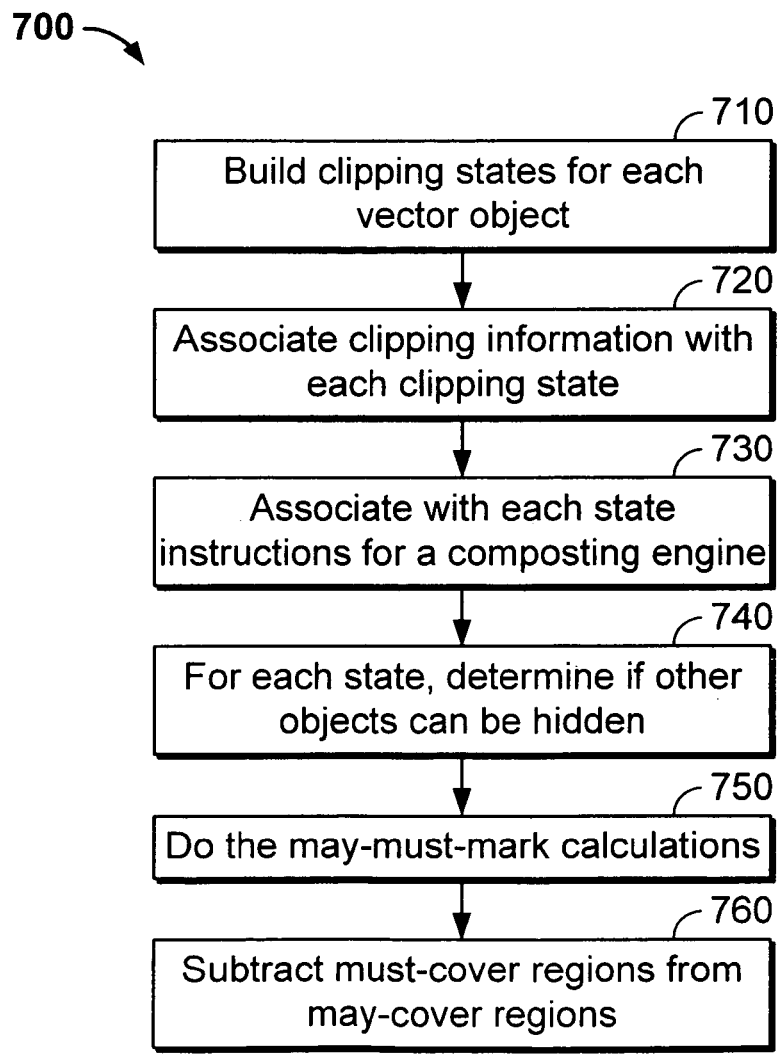
FIG. 7 shows an analysis method in accordance with the invention.

FIG. 7 shows one method, method 700, that the system performs to analyze the data of a composition. As shown in FIG. 7, the system considers each vector object independently and builds a sequence of clipping states (step 710). For example, an object having a centered stroke can have a clipping state that represents the object's exterior including, for example, a drop shadow for the object. The object can also have a state for representing its interior as well as a state for representing the stroke. The system associates two categories of information with each clipping state. The system associates clipping information with a state, including information to specify that there is no clipping path (step 720). For example, a clipping path is usually not needed to represent the drop shadow discussed above. The system also associates instructions typically required by a compositing engine to render the appearance of the clipping state (step 730). These instructions specify which portions of the rendering process for the object to invoke when compositing. For example, the instructions can specify the portion of the rendering process for drawing just the drop shadow.

FIG. 8A shows an image 800 of a circle with an outline 810, an outer stroke 820, a drop shadow 830, and an interior 840. FIGS. 8B–D show the clipping states that would be generated in this process. As shown in FIG. 8B, the exterior shows everything that appears outside of the object, including the drop shadow 830. The exterior is not clipped by anything (other than the bounds of the composition). As shown in FIG. 8C, the outer stroke 810 is clipped to a circle 840 that is an expansion of outline 810. FIG. 8D shows the interior 840, which is clipped to outline 810. Note that the system treats the outer stroke 820 as a solid fill and relies on the interior 840 to overwrite the portions of the solid fill to create a concentric circle that represents the stroke. This allows the system to avoid problems with abutting clipping paths would result if the system clips to just the stroke area.

As shown in FIG. 7, for each state, the system also determines if any other objects can be hidden by the state currently being considered (step 740). For example, if an object's interior is completely opaque and uses a normal blending mode, then a state representing the interior can conceal any objects lying beneath it in a simple compositing stack. More complex constructs like knockout or groups with masks can introduce further constraints on which objects can be concealed.

A state representing the exterior of the masking object in a clipping group conceals everything within the group. Note that to be included in a set of concealed objects, it is not necessary to have complete concealment of the object by the area bounded by the region of the clipping state. All that is required is that a pixel within the region of the clipping state be not visible because of attributes of the state and the state's role within the composition. The system represents the set of concealed objects by a general set construct. Alternatively, the system can represent the set of concealed objects with a range of object indices.

For each state the system uses the desired clip to calculate a "may cover" region and a "must cover" region (step 750). The may cover region corresponds to any locations that might get marked by a RIP when using the current clip. The must cover region corresponds to any locations that must fall inside the current clip when processed by the RIP. One can view these as being calculated by taking the desired clip and expanding and contracting it respectively for scan conversion precision issues. The calculation does not depend on a particular representation for these regions. It depends on being able to perform intersections and subtractions with the regions, to test the regions for emptiness, and to get a bounding box around the regions. Possible data representations include run arrays or bitmaps at a particular resolution. One implementation of the system uses a combination of a bounding rectangle and a bitmap. Optionally, the system defines the regions analytically. However, path algebra can be relatively complicated and it can be difficult to avoid creeping precision problems with repeated processing.

For each clipping state currently being considered, the system iterates through subsequent clipping states, i.e., states that are processed after the current state is processed, and subtracts the must cover region of the subsequent clipping state from the may cover region of the current clipping state (step 760). At the output stage, the pixels in a must cover region of a subsequent state will get marked eventually and hence do not need to be marked by the earlier state. The system prunes its recursion in the output stage when the intersection of may regions of active clipping states become empty (i.e., the may regions do not intersect). By reducing the area covered by the may regions, the intersections of the may regions become empty more frequently. Hence, the system can prune aggressively. At the end of the analysis phase for an individual vector object, the system discards the must cover regions for the clipping states of the vector object because these must cover regions are no longer needed. Depending on the exact sequence of operations used to generate the clipping states and to subtract must regions of subsequent states from may regions of a current state, the system can dispose of the must regions before the end of the analysis phase.

Optionally, if the system generates the clipping states in order, the system can actually do the region calculations and subtractions as it accumulates the list of states for an object.

Figure 9A:
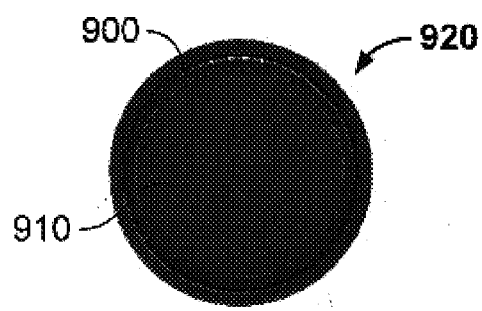
FIGS. 9A and B illustrate a may-must-mark calculation in accordance with the invention.
Figure 9B:
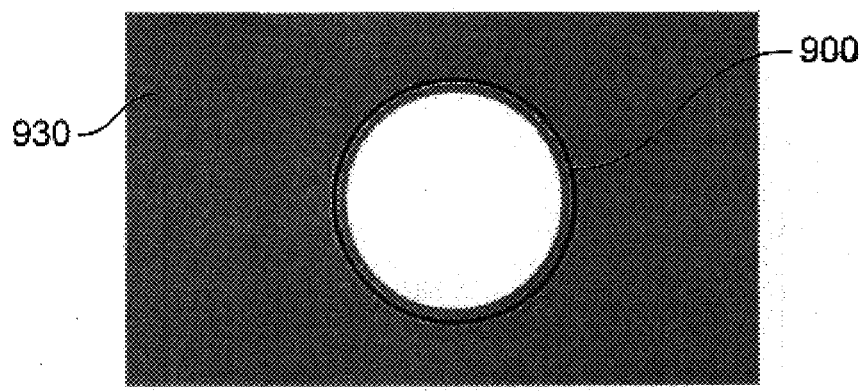

FIGS. 9A and B illustrate step 760. FIG. 9A shows the may and must regions for the interior of circle 900 (shown as just a black outline). Note that all pixels in the must region 910, which is the red region, are also part of the may region 920, which includes both the red and blue regions. FIG. 9B shows the calculated may region 930, which is the green region, for the exterior of circle 900. The initial may and must regions for the exterior consist of the entire composition. The system subtracts the must region 910 from the interior to produce the final may region for the exterior 930.

Figure 10:
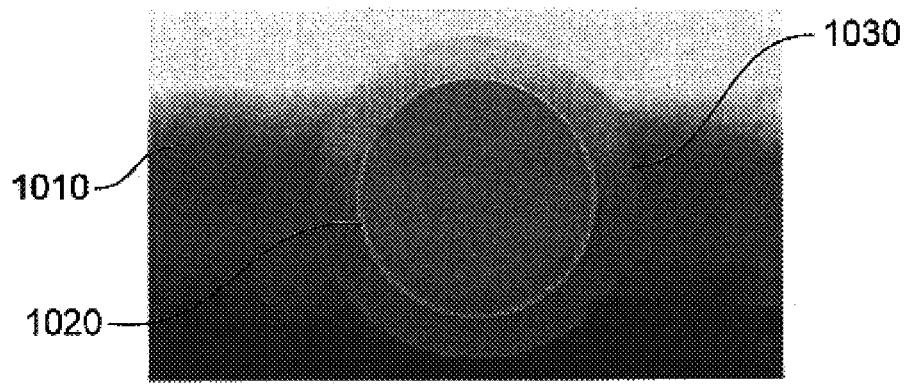
FIG. 10 shows an example of the may-must-mark calculation.

The described may-must-mark calculation allows the system to bypass processing portions of an image that do not appear in the final output image. For example, see FIG. 10, which shows a gradient 1010 and two nested circles 1020 and 1030. In this case, the recursive clipping approach produces four output images even though none of the portions of the image showing just the inner circle and the gradient appear in the final output image. On the other hand, the augmented recursive clipping method, assuming that there is sufficient separation between the two circles 1020 and 1030, produces only three images because the may region for the exterior of the outer circle 1030 will not overlap the may region for the interior of the inner circle 1020.

Referring back to FIG. 6, the system sorts the list of vector objects (step 620). This phase is optional but can be important to making good use of the concealment information. The goal is that if any state of object A can conceal object B, then object A should be processed before object B. If there are objects that can conceal one another, then the system skips the sorting phase. For example, the system skips the sorting phase in a case where a first object can conceal a second object, which can in turn conceal a third object, which can in turn conceal the first object. Alternatively, the system performs a partial sort instead of not sorting at all.

The system generates a final output image (step 630). In addition to maintaining the previous information, the system maintains a concealment count per vector object. These counts are initialized to zero. The pseudo-code in Table 3 below shows one method for generating the final output image.

TABLE 3

```
PROCEDURE GenerateOutput
    (objects: LIST OF VectorObject; mayMark: Region);
    IF EmptyList (objects)THEN
        OutputImageForCompositedArtwork (RegionBounds (mayMark));
    ELSE
        LET obj: VectorObject :=First (objects);
        IF 0 <GetConcealmentCount (obj)THEN
```

TABLE 3-continued

```
            GenerateOutput (Rest (objects), mayMark)
        ELSE
            FOR i: Integer :=0 TO GetClipStateCount (obj) − 1 DO
                LET state: ClipState :=GetClipState (obj, i);
                LET stateMayMark: Region :=GetClipStateMayMark
                    (state);
                LET overlap: Region :=
                        IntersectRegions (mayMark, stateMayMark);
                IF NOT EmptyRegion (overlap)THEN
                        LET concealsCount: Integer :=
                                GetClipStateConcealsCount (state);
                        FOR j: Integer :=0 TO concealsCount − 1 DO
                            IncrementConcealmentCount
                                (GetConcealedObject (state, j))
                        END;
                        OutputPushClip (GetClipStateVectorData
                            (state)); 12
                        SetVectorObjectRenderingState
                            (obj, GetClipStateRendering (state));
                    GenerateOutput (Rest (objects), overlap);
                    SetVectorObjectRenderingState (obj, shown);
                    OutputPopClip ( );
                    FOR k: Integer :=0 TO concealsCount − 1
                        DO DecrementConcealmentCount
                            (GetConcealedObject (state, k))
                    END
                END
            END
        END
    END
END GenerateOutput;
```

It is possible to elide pop clip operations with push clip operations. In particular, for unclipped clip states, e.g., the exterior of vector objects, the implementation suppresses the pushing and popping of the clip data entirely.

Similar to the method described in reference to Table 1 for performing recursive clipping, to start an augmented recursive clipping process, the system calls a routine implementing the pseudo-code of Table 2 and inputs a sorted-object list and a region that represents the entire composition.

Optionally, the system limits the clipping depth. The system counts the number of times it has clipped. When it has exceeded the depth limit, the system invokes OutputImageForCompositedArtwork just as if the object list had become empty.

Another option is to pass the may-mark region to OutputImageForCompositedArtwork instead of passing just the region's bounding box. This option limits the compositing further or can be used to increase the compression on the hidden areas outside the region when writing the image to the output. The compression increase results in an output with pieces that looked like crude approximations to the results from planar mapping.

In summary, an augmented recursive clipping method provides the following features. The system can handle multi-part vector objects without having to convert them into general artwork. Note that one form of a multi-part vector object is a planar map. Hence, the system encompasses artwork that has planar-mapped objects though it does not build a planar map for the totality of the objects.

By accounting for other areas that will be marked later, the may-must-mark calculations prune many superfluous branches of the recursion. In particular, if one vector object is completely contained within the bounds of another object, then the system recognizes that the exterior of the outer object intersected with the interior of the inner object is empty. The conventional recursive clipping process does not detect this problem.

The augmented recursive method incorporates the notion of vector objects concealing other objects in a general way. That is, the method allows the exterior of an object to conceal other objects.

The augmented recursive method isolates all understanding about the actual imaging model into the analysis phase. The system does not have to consider the imaging model in the optional sorting or the outputting phase, in which the system performs the recursions. The actual recursive process can work with a variety of imaging models.

The recursion-depth limits provide a useful fallback to prevent the results from growing too explosively as a result of a deep recursion.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the invention. For example, steps of the invention can be performed in a different order and still achieve desirable results.

What is claimed is:

1. A method for preparing one or more vector data objects for rendering, the method comprising:
   receiving a first object that is a vector data object;
   defining clipping states for the first object, each clipping state representing, for a stage of rendering, an image associated with the first object, wherein the clipping states have an order in which they are to be rendered;
   for each clipping state, determining whether a clipping path is needed to render the image represented by the clipping state, and when a clipping path is needed, generating clipping instructions for calculating a clipping path for the clipping state, and when a clipping path is not needed, generating clipping instructions indicating that a clipping path is not needed;
   for each clipping state, generating rendering instructions for rendering the image represented by the clipping state;
   associating the generated clipping and rendering instructions to the corresponding clipping states;
   for each clipping state, calculating a may-cover region that a rendering device may mark, the calculation being based on the associated clipping instructions and the precision of the rendering device;
   for each clipping state, calculating a must-cover region that the rendering device must mark, the calculation being based on the associated clipping instructions and the precision of the rendering device; and
   calculating a final may-cover region for each clipping state, including subtracting from the may-cover region of a clipping state the must-cover regions of all clipping states that are to be rendered after the current clipping state is rendered.

2. The method of claim 1, wherein:
   receiving the first object includes receiving rendering information; and
   generating rendering instructions includes generating special rendering instructions in addition to any instructions for hiding the first object and any instructions for showing the contents of the first object, the special rendering instructions including instructions that specify which portion of the received rendering information is needed to render the image represented by the clipping state.

3. The method of claim 1, further comprising:
   receiving a second object; and
   determining whether a clipping state of the first object conceals at least a portion of the second object.

4. The method of claim 3, wherein:
   determining whether the first object conceals the second object includes determining whether the second object appears only within some but not all of the clipping states of the first object.

5. The method of claim 3, wherein:
   determining whether the first object conceals the second object includes determining whether the second object is only visible inside the first object whereby a clipping state of an exterior appearance of the first object conceals the second object.

6. The method of claim 3, further comprising:
   when a clipping state of the first object conceals the second object, generating instructions to cause the first object to be processed by a recursive output process before the second object is processed by the recursive output process, wherein the recursive output process generates instructions for an output device to render a combined image that is associated with the first and second objects.

7. The method of claim 6, wherein generating special rendering instructions for the clipping state that conceals the second object includes:
   generating instructions to cause the recursive output process to ignore the second object while processing the clipping state.

8. The method of claim 3, wherein receiving the second object includes receiving a second object that is a vector data object.

9. The method of claim 1, further comprising:
   specifying a limit on the number of clipping paths that are active at one time during a recursive output process that generates instructions for an output device to render the first object.

10. The method of claim 9, further comprising:
    performing the recursive output process to the first object, wherein, when the limit is reached, temporarily treating any remaining vector data objects as non-vector data objects.

11. A computer program product, tangibly stored on a machine-readable medium, for preparing one or more vector data objects for rendering, comprising instructions operable to cause a programmable processor to:
    receive a first object that is a vector data object;
    define clipping states for the first object, each clipping state representing, for a stage of rendering, an image associated with the first object, wherein the clipping states have an order in which they are to be rendered;
    for each clipping state, determine whether a clipping path is needed to render the image represented by the clipping state, and when a clipping path is needed, generate clipping instructions for calculating a clipping path for the clipping state, and when a clipping path is not needed, generate clipping instructions indicating that a clipping path is not needed;
    for each clipping state, generate rendering instructions for rendering the image represented by the clipping state;
    associate the generated clipping and rendering instructions to the corresponding clipping states;

for each clipping state, calculate a may-cover region that a rendering device may mark, the calculation being based on the associated clipping instructions and the precision of the rendering device;

for each clipping state, calculate a must-cover region that the rendering device must mark, the calculation being based on the associated clipping instructions and the precision of the rendering device; and calculate a final may-cover region for each clipping state, including subtracting from the may-cover region of a clipping state the must-cover regions of all clipping states that are to be rendered after the current clipping state is rendered.

12. The computer program product of claim 11, further comprising instructions to:

receive rendering information for the first object; and generate special rendering instructions in addition to any instructions for hiding the first object and any instructions for showing the contents of the first object, the special rendering instructions including instructions that specify which portion of the received rendering information is needed to render the image represented by the clipping state.

13. The computer program product of claim 11, further comprising instructions to:

receive a second object; and determine whether a clipping state of the first object conceals the second object.

14. The computer program product of claim 13, further comprising instructions to:

determine whether the second object appears only within some but not all of the clipping states of the first object.

15. The computer program product of claim 13, further comprising instructions to:

determine whether the second object is only visible inside the first object wherein a clipping state of an exterior appearance of the first object conceals the second object.

16. The computer program product of claim 13, further comprising instructions to:

when a clipping state of the first object conceals the second object, generate instructions to cause the first object to be processed by a recursive output process before the second object is processed by the recursive output process, wherein the recursive output process generates instructions for an output device to render a combined image that is associated with the first and second objects.

17. The computer program product of claim 16, further comprising instructions to:

generate instructions to cause the recursive output process to ignore the second object while processing the clipping state that hides the second vector data object.

18. The computer program product of claim 13, wherein the second object is a vector data object.

19. The computer program product of claim 11, further comprising instructions to:

specify a limit on the number of clipping paths that are active at one time during a recursive output process that generates instructions for an output device to render the first object.

20. The computer program product of claim 19, further compressing instructions to:

perform the recursive output process to the first object, wherein, when the limit is reached, temporarily treating any remaining vector data objects as non-vector data objects.

21. The method of claim 1, wherein defining clipping states includes:

defining a clipping state that represents, for a stage of rendering, an image of only an exterior effect associated with the first object.

22. The product of claim 11, further comprising instructions to:

define a clipping state that represents, for a stage of rendering, an image of only an exterior effect associated with the first object.

* * * * *

UNITED STATES PATENT AND TRADEMARK OFFICE
CERTIFICATE OF CORRECTION

PATENT NO. : 7,126,578 B1 Page 1 of 1
APPLICATION NO. : 10/098328
DATED : October 24, 2006
INVENTOR(S) : Mark Hamburg It is certified that error appears in the above-identified patent and that said Letters Patent is hereby corrected as shown below:

Column 16, line 25, delete "compressing" and replace with --comprising--;
        line 35, after "The", insert --computer program--.

Signed and Sealed this

Thirtieth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 7,126,578 B1 Page 1 of 1
APPLICATION NO. : 10/098328
DATED : October 24, 2006
INVENTOR(S) : Hamburg It is certified that error appears in the above-identified patent and that said Letters Patent is hereby corrected as shown below:

On the cover page,

[*] Notice: Subject to any disclaimer, the term of this patent is extended or adjusted under 35 USC 154(b) by 352 days Delete the phrase "by 352" and insert -- by 472 days --

Signed and Sealed this

Fourth Day of September, 2007

JON W. DUDAS
*Director of the United States Patent and Trademark Office*